(12) United States Patent
Choi

(10) Patent No.: US 11,740,834 B2
(45) Date of Patent: Aug. 29, 2023

(54) UFS DEVICE FOR TRANSMITTING STATUS INFORMATION THROUGH AFC FRAME AND OPERATING METHOD THEREOF

(71) Applicant: SK hynix Inc., Gyeonggi-do (KR)

(72) Inventor: Moon Soo Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 36 days.

(21) Appl. No.: 17/316,969

(22) Filed: May 11, 2021

(65) Prior Publication Data

US 2022/0197558 A1 Jun. 23, 2022

(30) Foreign Application Priority Data

Dec. 22, 2020 (KR) .................... 10-2020-0180463

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0604; G06F 3/0679; G06F 3/0653
See application file for complete search history.

(56) References Cited

U.S. PATENT DOCUMENTS

| | | | | |
|---|---|---|---|---|
| 2013/0061099 A1* | 3/2013 | Radulescu | ............ | H04L 1/1858 714/708 |
| 2016/0170824 A1* | 6/2016 | Hamo | ................ | H04L 1/1671 714/763 |
| 2017/0102893 A1* | 4/2017 | Yoon | ................ | G06F 3/0679 |
| 2018/0115480 A1* | 4/2018 | Hsu | ................ | H04L 43/18 |
| 2020/0341825 A1* | 10/2020 | Sudarmani | .......... | G06F 13/1621 |
| 2021/0004176 A1* | 1/2021 | Seo | ................ | G06F 13/102 |
| 2021/0103393 A1* | 4/2021 | Abhani | ................ | H04L 1/1896 |
| 2021/0334225 A1* | 10/2021 | Seo | ................ | G06F 13/1668 |
| 2022/0164296 A1* | 5/2022 | Abhani | ................ | G06F 1/3275 |
| 2022/0188025 A1* | 6/2022 | Tanpairoj | ............ | G06F 3/0673 |

FOREIGN PATENT DOCUMENTS

KR 10-2016-0112765 A 9/2016
KR 10-1911059 B1 10/2018

OTHER PUBLICATIONS

Computer Hope, "Frame," updated Aug. 2, 2020, available: https://www.computerhope.com/jargon/f/frame.htm#:-:text=Frame%201%201.%20In%20software%2C%20a%20frame%20is,of%20a%20block%20of%20data.%203%204.%20.*

\* cited by examiner

*Primary Examiner* — Tracy A Warren

(74) *Attorney, Agent, or Firm* — IP & T Group LLP

(57) ABSTRACT

Embodiments of the present disclosure relate to an UFS device and an operating method thereof. According to the embodiments of the present disclosure, the UFS device may collect status information of the UFS device, create an Acknowledgement and Flow Control (AFC) frame including the collected status information, and transmit the AFC frame to a host performing communication with the UFS device.

17 Claims, 12 Drawing Sheets

UFS DEVICE FOR TRANSMITTING STATUS INFORMATION THROUGH AFC FRAME AND OPERATING METHOD THEREOF

CROSS-REFERENCE TO RELATED APPLICATION

The present application claims priority under 35 U.S.C. 119(a) to Korean patent application number 10-2020-0180463 filed on Dec. 22, 2020, which is incorporated herein by reference in its entirety.

BACKGROUND

1. Technical Field

The various embodiments relate to a UFS (Universal Flash Storage) device and an operating method thereof.

2. Related Art

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

The UFS device may process a command UPIU (UFS Protocol Information Unit) received from the host and transmit a response UPIU, which is a response thereto, to the host. In this case, the UFS device may transmit the status information of the UFS device to the host by including the status information of the UFS device in the response UPIU.

SUMMARY

Embodiments of the present disclosure may provide a UFS device and an operating method thereof capable of quickly transmitting the UFS device status information to the host.

Furthermore, embodiments of the present disclosure may provide a UFS device and an operating method thereof capable of supporting the host to check the status information of UFS devices in real time.

In one aspect, embodiments of the present disclosure may provide a universal flash storage (UFS) device.

The UFS device may collect status information of the UFS device.

The UFS device may create an Acknowledgement and Flow Control (AFC) frame including the collected status information.

The UFS device may transmit the AFC frame to a host performing communication with the UFS device.

In this case, the status information may include at least one of 1) temperature information of the UFS device, 2) voltage change information of the UFS device, 3) information on a communication layer between the host and the UFS device, and 4) command transmission hold request information for the host.

The UFS device may create the AFC frame by writing the status information to one or more status information registers included in the UFS device, and then storing, in the created AFC frame, the status information written in the status information registers.

In another aspect, embodiments of the present disclosure may provide an operating method of a universal flash storage (UFS) device.

The operating method of the UFS device may include collecting status information of the UFS device.

The operating method of the UFS device may include creating an Acknowledgement and Flow Control (AFC) frame including the collected status information.

The operating method of the UFS device may include transmitting the AFC frame to a host performing communication with the UFS device.

In this case, the status information may include at least one of 1) temperature information of the UFS device, 2) voltage change information of the UFS device, 3) information on a communication layer between the host and the UFS device, and 4) command transmission hold request information for the host.

The operation of creating the AFC frame may include writing the status information to one or more status information registers included in the UFS device, and then storing, in the created AFC frame, the status information written in the status information registers.

In another aspect, embodiments of the present disclosure may provide an operating method of a system including a host device and a universal flash storage (UFS) device.

The operating method of the system may include communicating, by the host device and the UFS device, with each other according to a standard of Mobile Industry Processor Interface (MIPI).

The operating method of the system may include providing, by the UFS device, the host device with information of a status of the UFS device through an acknowledgement and flow control (AFC) frame defined by the standard.

The operating method of the system may include receiving, by the host device, the AFC frame to recognize the status.

An operating method of the universal flash storage (UFS) device may include communicating with a host device according to a standard of Mobile Industry Processor Interface (MIPI).

The operating method of the universal flash storage (UFS) device may include providing the host device with information of a status of the UFS device through an acknowledgement and flow control (AFC) frame defined by the standard.

An operating method of the host device may include communicating with a universal flash storage (UFS) device according to a standard of Mobile Industry Processor Interface (MIPI).

The operating method of the host device may include receiving from the UFS device an acknowledgement and flow control (AFC) frame, which is defined by the standard and includes information of a status of the UFS device, to recognize the status.

According to the embodiments of the present disclosure, it is possible to guarantee high reliability compared to the existing UFS device by quickly transmitting the status information of the UFS device to the host in order for the host to check the status information of the UFS device in real time.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
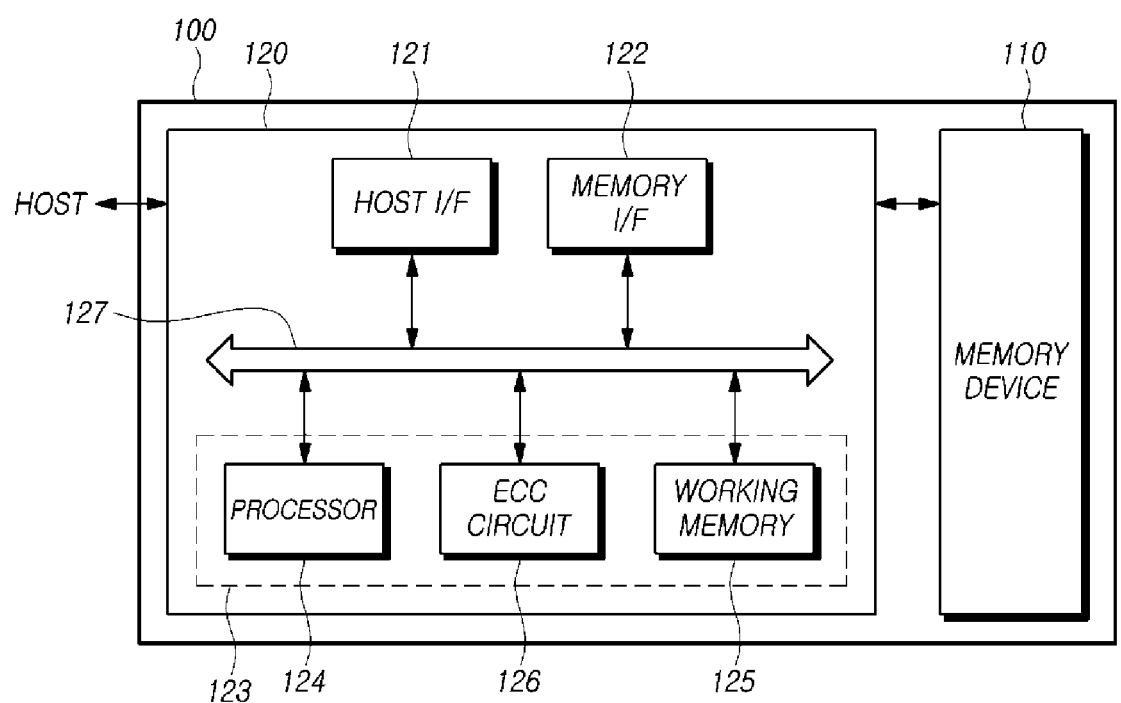
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120, to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of the constituent elements illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
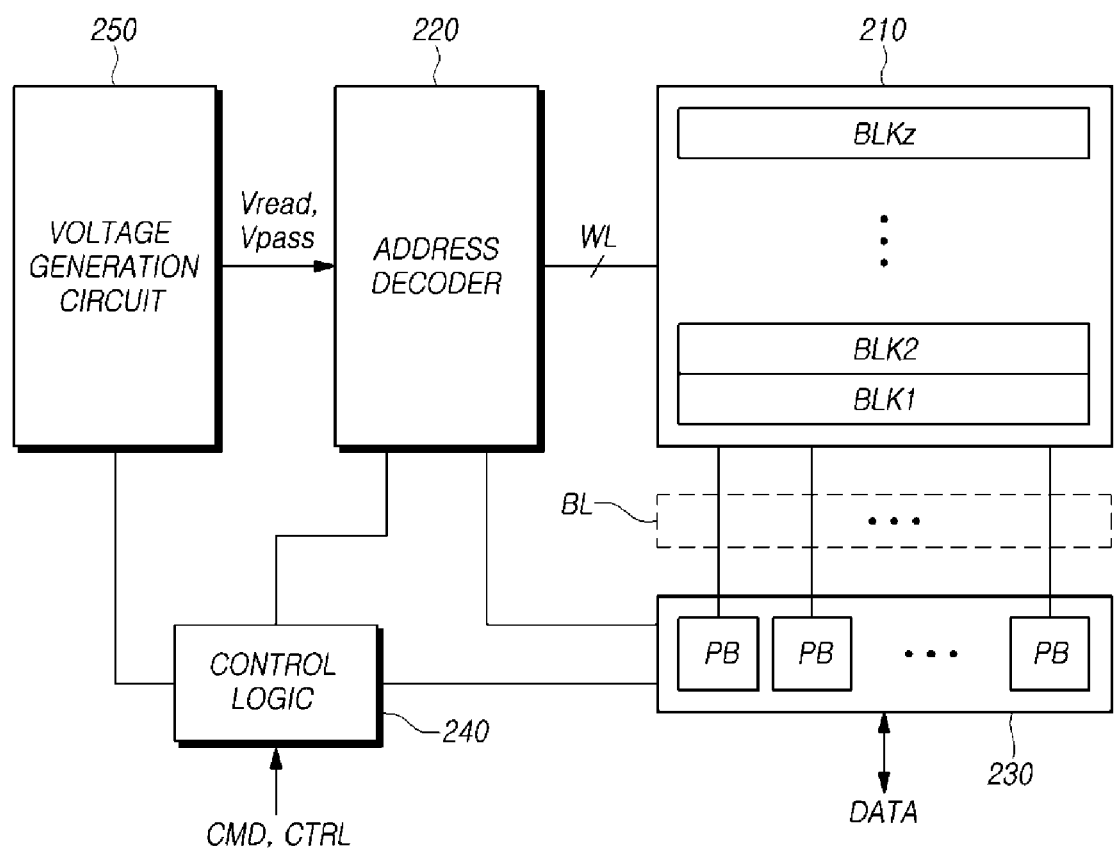
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or greater than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
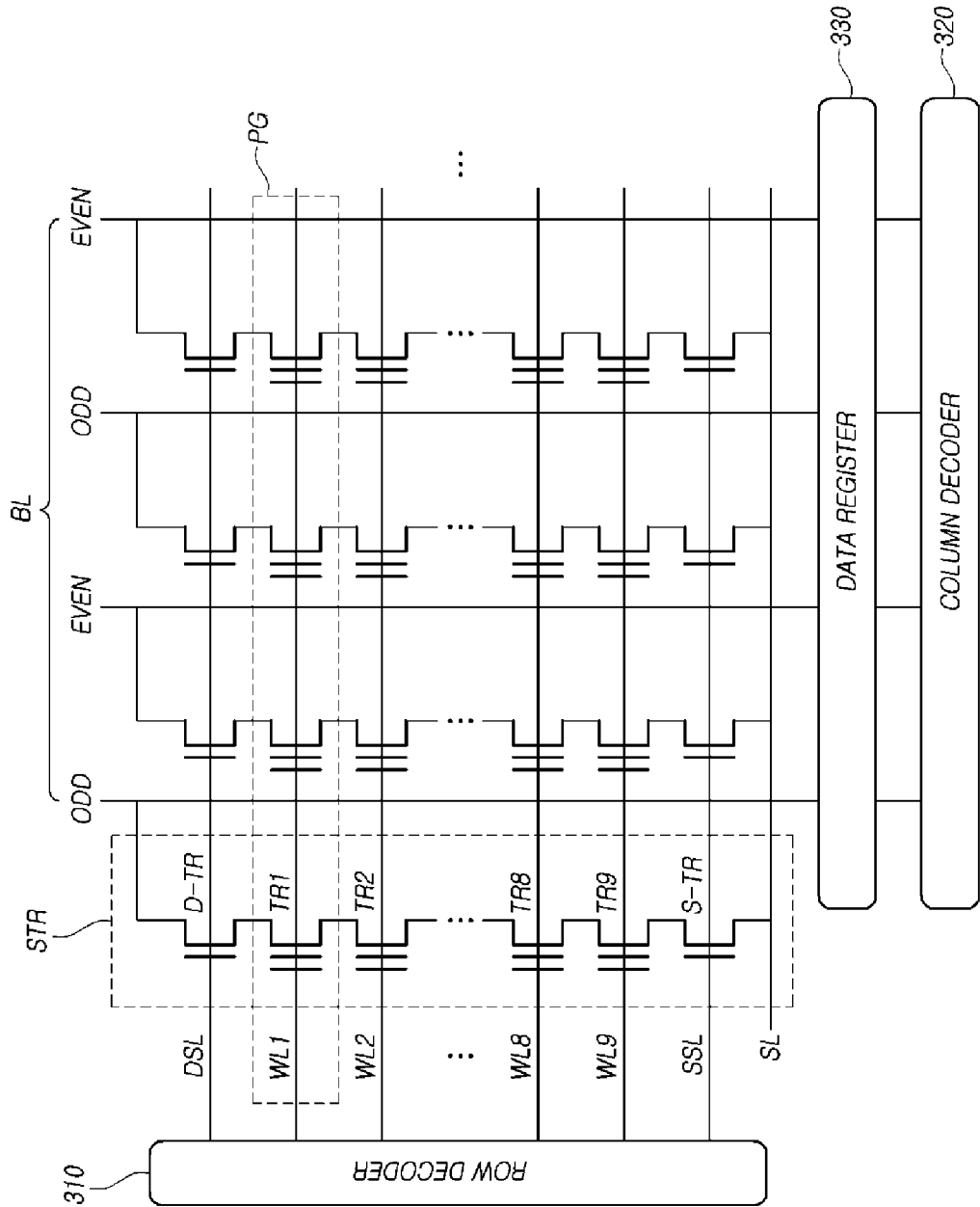
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area which is the remaining area other than the core area, to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
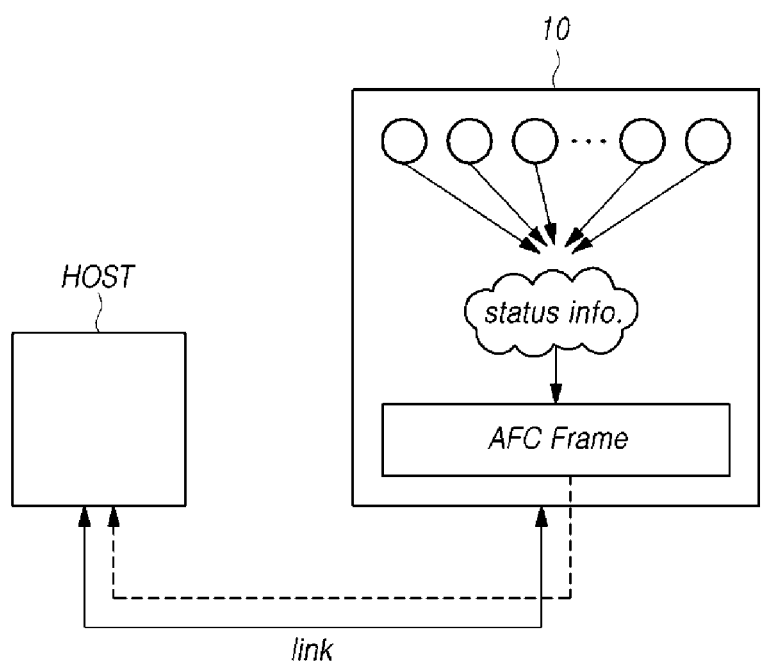
FIG. 4 is a schematic diagram of the UFS device according to embodiments of the present disclosure.

FIG. 4 is a schematic diagram of the UFS device 10 according to embodiments of the present disclosure.

Referring to FIG. 4, the UFS device 10 may communicate with the host based on a UFS protocol. For example, the UFS device 10 may communicate with the host through a mobile industry processor interface (MIPI) M-PHY and a MIPI Unipro (Unified Protocol), hereinafter, collectively used for UFS protocol.

In addition, the UFS device 10 may collect status information of the UFS device 10 while performing communication with the host and create an Acknowledgment and Flow Control (AFC) frame including the collected status information.

The AFC frame is a frame used for the flow control between the host and the UFS device 10 on a data link layer defined by the UFS protocol.

After the link between the host and the UFS device 10 is created on the data link layer, the AFC frame may be used while executing the operation related to the link.

As an example, the AFC frame may be used to check the initial status of the data link layer between the host and the UFS device 10 at a time when the link startup operation or a hibernate state exit operation is executed.

As another example, the AFC frame may be used to execute flow control on the data frame by transmitting the sequence number for the data received so far by a receiver to a transmitter at the time when executing the data transfer operation between the host and the UFS device 10. Each of the host and the UFS device 10 may be any of the receiver and the transmitter.

The UFS device 10 may transmit an AFC frame including the collected status information of the UFS device 10 to the host. Therefore, the UFS device 10 may transmit the collected status information of the UFS device 10 to the host.

The case of transmitting the status information of the UFS device 10 to the host through the AFC frame may have the following effects compared with the case in which the status information of the UFS device 10 is transmitted through the response UPIU for the command UPIU received from the host.

In the case in which the UFS device 10 transmits the status information of the UFS device 10 through the response UPIU for the command UPIU received from the host, the UFS device 10 is required to wait for the host to transmit a command UPIU to the UFS device 10. After receiving the command UPIU from the host, the UFS device 10 may write the status information of the UFS device 10 in the device information attribute on the response UPIU, and set a bit indicating that the status information of the UFS device 10 has been written to the response UPIU, and then transmit the response UPIU to the host. After receiving the response UPIU and confirming the writing of the status information of the UFS device 10, the host may check the status information of the UFS device 10 based on the value written in the device information attribute on the response UPIU.

In this case, the UFS device 10 may only transmit the status information to the host only when the host transmits the command UPIU, and may not itself transmit the status information of the UFS device 10 to the host without reception of the command UPIU. Therefore, if a problem occurs in the UFS device 10, the host may recognize the problem occurring in the UFS device 10 late, so that a resolution for the problem occurring in the UFS device 10 may be delayed.

On the other hand, when the UFS device 10 transmits the status information of the UFS device 10 by using the AFC frame, the UFS device 10 may transmit the status information of the UFS device 10 to the host more quickly. This is because once the link between the host and the UFS device 10 is created, the AFC frame can be transmitted to the host during the operation related to the link even if there is no request from the host. Accordingly, the host may check the status information of the UFS device 10 in real time by the AFC frame during communication with the UFS device 10, and may execute actions according to the state of the UFS device 10. Therefore, the UFS device 10 can guarantee a higher reliability than the conventional UFS device.

As an example, when the host determines the UFS device 10 as abnormal based on the status information of the UFS device 10, for example, when the temperature of the UFS device 10 exceeds the allowed limit temperature or the voltage change of the UFS device 10 exceeds the reference range or the error occurrence rate of the data link layer exceeds the allowed threshold ratio, the host may reduce the communication speed with the UFS device 10.

Moreover, the memory system 100 described above with reference to FIG. 1 may be applied as the UFS device 10. For example, data may be stored in the memory device 110 of the memory system 100 as the UFS device 10, and the memory controller 120 of the memory system 100 as the UFS device 10 may communicate with the host according to the UFS protocol, and may execute the operation of reading or writing data to the memory device 110.

Figure 5:
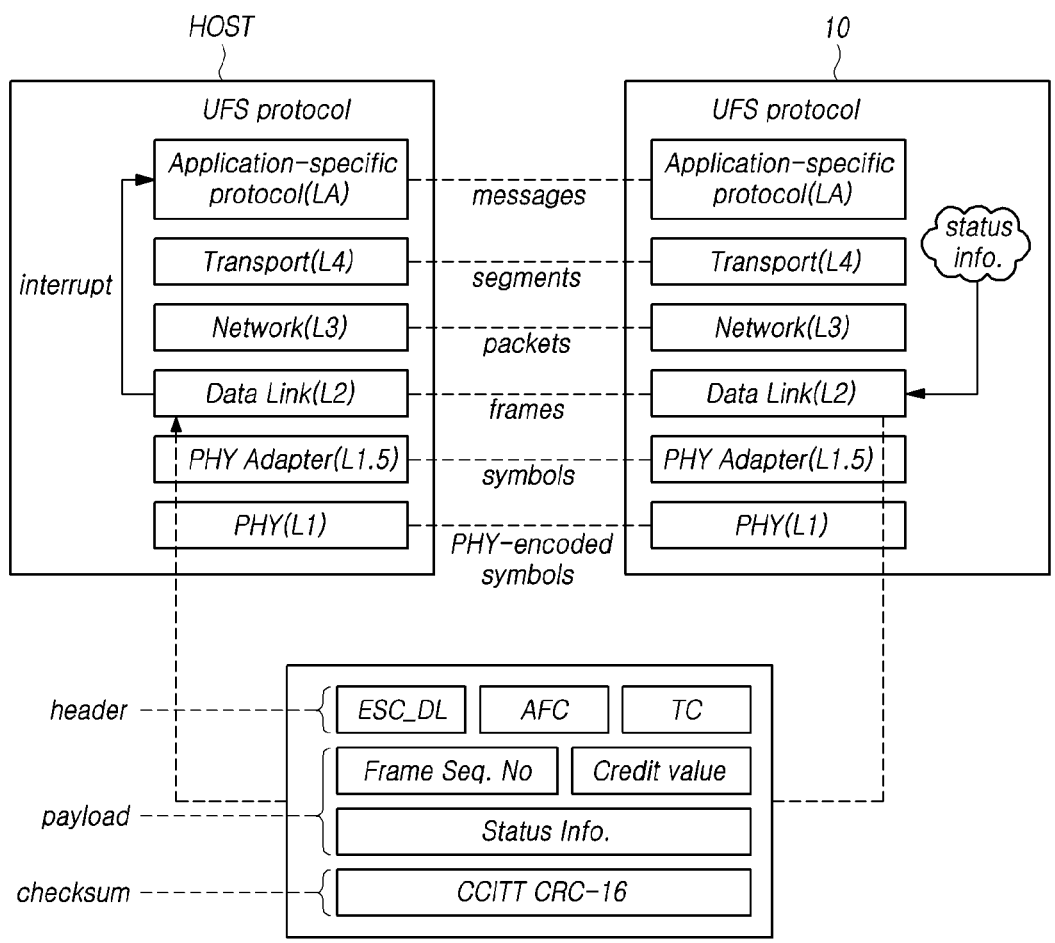
FIG. 5 is a diagram illustrating an example in which the UFS device transmits the AFC frame to the host according to embodiments of the present disclosure.

FIG. 5 is a diagram illustrating an example in which the UFS device 10 transmits the AFC frame to the host according to embodiments of the present disclosure.

Referring to FIG. 5, the UFS device 10 and the host may perform communication based on the UFS protocol. In this case, the UFS protocol may have a multi-layered structure including a plurality of communication layers.

The communication layer included in the UFS protocol may be as follows.

The UFS protocol may include a physical layer PHY that is an L1 layer. The physical layers of the UFS device 10 and the host may exchange symbols encoded according to a specific physical format.

The UFS protocol may include the physical adapter layer, which is the L1.5 layer. The physical adapter layer is a layer that performs conversion between the physical layer and the data link layer, and the physical adapter layer of the UFS device 10 and the host may exchange symbols with each other.

In addition, the UFS protocol may include the data link layer which is the L2 layer. The data link layer of the UFS device 10 and the host may exchange frames with each other.

The UFS protocol may include the network layer which is an L3 layer. The network layer of the UFS device 10 and the host may exchange packets with each other.

In addition, the UFS protocol may include the transport layer which is an L4 layer. The transport layer of the UFS device 10 and the host may exchange segments with each other.

In addition, the UFS protocol may additionally include the application-specific protocol layer. The application-specific protocol layer of the UFS device 10 and the host may exchange messages created based on a protocol defined for each application with each is other.

In FIG. 5, the UFS device 10 may, when creating the AFC frame in the data link layer, include the collected status information of the UFS device 10 in the AFC frame. In this case, the data link layer of the UFS device 10 may collect status information of the UFS device 10 through a device management entity (not shown).

The UFS device 10 may include status information of the UFS device 10 in a preset area inside the AFC frame. The AFC frame may be divided into a header, a payload, and a checksum. Within the payload, the status information of the UFS device 10 may be included in the area allocated for the status information.

When the UFS device 10 transmits the AFC frame to the host, the host may receive the status information of the UFS device 10 based on the AFC frame transmitted by the UFS device 10 through the data link layer. The host may transfer, to an application-specific protocol layer through an interrupt, the fact that the status information of the UFS device 10 has been received. In this case, the data link layer of the UFS device 10 may transfer the corresponding interrupt to the application-specific protocol layer through the device management entity (not shown).

In the above, the operation of the UFS device 10 to transmit the AFC frame to the host has been described.

Hereinafter, a specific example of the status information of the UFS device 10 included in the AFC frame will be described.

Figure 6:
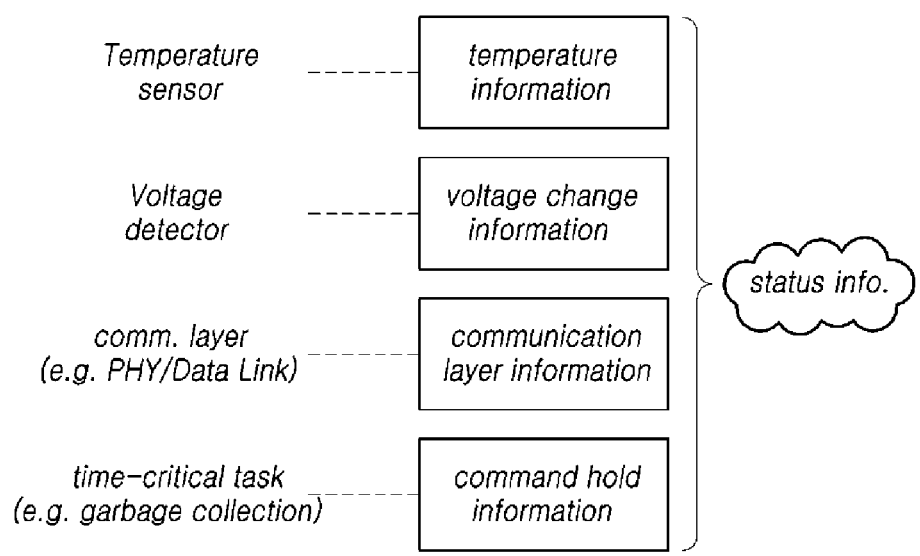
FIG. 6 is a diagram illustrating an example of status information according to embodiments of the present disclosure.

FIG. 6 is a diagram illustrating an example of status information according to embodiments of the present disclosure.

Referring to FIG. 6, the status information of the UFS device 10 may include at least one of temperature information of the UFS device 10, voltage change information of the UFS device 10, information on the communication layer between the host and the UFS device 10, and command transmission hold request information for the host.

The UFS device 10 may collect temperature information of the UFS device 10 from a temperature sensor. casein an embodiment, the temperature sensor may be located inside the UFS device 10, and may measure the temperature of a specific area inside the UFS device 10 or a specific module included in the UFS device 10.

The UFS device 10 may detect the change in voltage supplied to the UFS device 10 from a voltage detector. The voltage detector may be located inside the UFS device 10, and may detect whether the change in the voltage supplied to the UFS device 10 is equal to or greater than a set reference (e.g., the voltage changes by more than a first value during a reference time).

The UFS device 10 may acquire information on the communication layer by monitoring the state of the communication layer described in FIG. 5. In this case, the communication layer may be, for example, the data link layer or the physical layer among the communication layers described in FIG. 5.

A time-critical task (e.g., garbage collection) may be required to be urgently processed for the UFS device 10 to operate stably. When the time-critical task (e.g., garbage collection) occurs, the UFS device 10 may request a command transmission hold to the host in order to prevent a delay in processing the time-critical task due to a command transmitted from the host. When the host receives the request to hold the command transmission from the UFS device 10, the host may temporarily hold command transmission.

Figure 7:
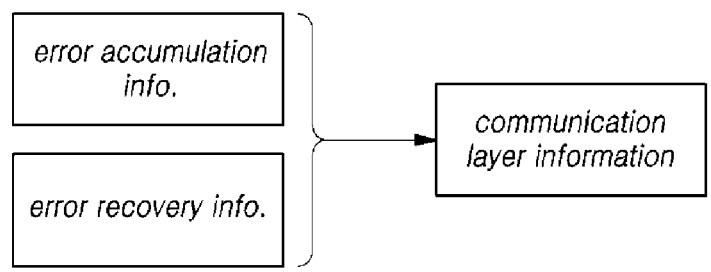
FIG. 7 is a diagram illustrating an example of information included in the communication layer information of FIG. 6.

FIG. 7 is a diagram illustrating an example of information included in the communication layer information of FIG. 6.

Referring to FIG. 7, the information on the communication layer may include at least one of error accumulation information, which is information on errors that have been accumulated in the corresponding communication layer, and error recovery information, which is information on an operation of recovering an error generated in the communication layer.

The error accumulation information may be the total number of errors accumulated in the communication layer from the set reference time point, and the error recovery information may be the total number of recovered errors among the accumulated errors in the communication layer from the set reference point. The UFS device 10 may manage error accumulation information and error recovery information through error-related attributes of the Unipro layer, and may include error accumulation information and error recovery information in the AFC frame.

In the above, an example of status information included in the AFC frame has been described.

Hereinafter, an example of the operation in which the UFS device 10 includes status information in an AFC frame will be described.

Figure 8:
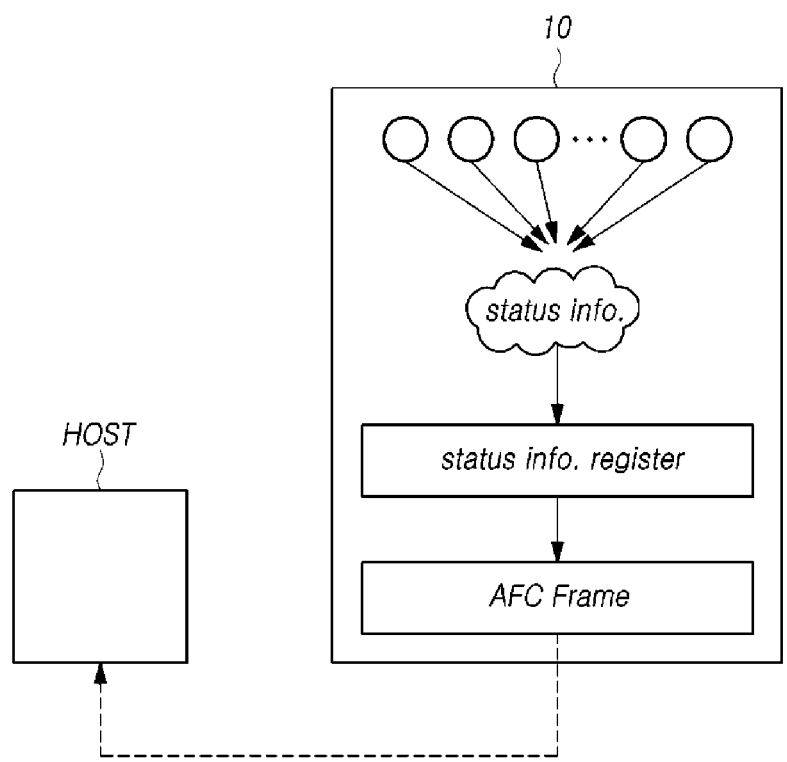
FIG. 8 is a diagram illustrating an example of including status information in the AFC frame by the UFS device according to embodiments of the present disclosure.

FIG. 8 is a diagram illustrating an example of including status information in the AFC frame by the UFS device 10 according to embodiments of the present disclosure.

Referring to FIG. 8, the UFS device 10 may write the collected status information of the UFS device 10 to one or more status information registers included in the UFS device 10, and then may include, in the AFC frame, the status information written in the status information register. The UFS device 10 may transmit the AFC frame to the host after the status information written in the status information register is included in the AFC frame.

In this case, different types of status information may be written for each status information register. For example, temperature information of the UFS device 10 may be written to one of the status information registers, voltage change information of the UFS device 10 may be written to the other of the status information registers, and communication layer information may be written to another status information registers.

Figure 9:
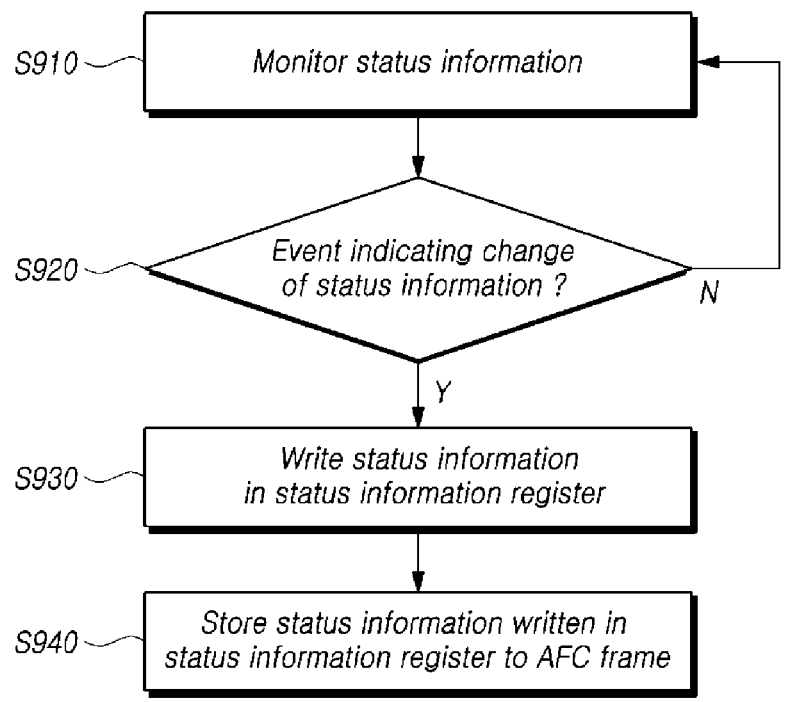
FIG. 9 is a flowchart illustrating an example of the operation of including status information in the AFC frame by the UFS device according to embodiments of the present disclosure.

FIG. 9 is a flowchart illustrating an example of the operation of including status information in the AFC frame by the UFS device 10 according to embodiments of the present disclosure.

Referring to FIG. 9, the UFS device may monitor the status information (S910).

For example, the UFS device 10 may directly check the value of the status information at each preset period. For example, the UFS device 10 may periodically collect error accumulation information and error recovery information occurring in the above-described communication layer (e.g., physical layer, data link layer) after the link between the host and the UFS device 10 is connected.

As another example, the UFS device 10 may monitor whether an interrupt indicating a change in a value of the status information occurs by using a module (e.g., a temperature sensor, a voltage detector) for collecting status information. For example, the temperature sensor may generate the interrupt when the temperature of the UFS device 10 is out of a preset temperature range, and the voltage detector may generate the interrupt when the voltage of the UFS device 10 is out of a preset voltage range.

The UFS device 10 may determine whether an event indicating a change of status information has occurred (S920). As an example, the UFS device 10 may determine that, when the interrupt indicating the change in the value of the status information occurs, the event indicating the change in the status information occurs.

When the event indicating change of status information occurs (S920-Y), the UFS device 10 may write the status information to one or more status information registers described in FIG. 8 (S930). As an example, the UFS device 10 may execute an interrupt service routine (ISR) for processing the interrupt indicating the change of value of the status information, and then write the status information to the status information register.

The UFS device 10 may store, in the AFC frame, status information written in one or more status information registers (S940). The AFC frame may include the status information written in one or more status information registers.

On the other hand, when the event indicating the change in status information does not occur (920-N), the UFS device 10 may enter operation S910 and monitor the status information again.

In the above, the operation of storing the status information in the AFC frame by the UFS device 10 has been described.

Hereinafter, the timing at which the UFS device 10 transmits the AFC frame including the status information to the host will be described.

As an example, when a link is created on the data link layer between the host and the UFS device 10, the UFS device 10 may transmit the AFC frame including status information to the host for all operations of transmitting frames through the link.

As another example, the UFS device 10 may transmit the AFC frame including status information to the host only at a specific time. Hereinafter, this will be described in FIG. 10.

Figure 10:
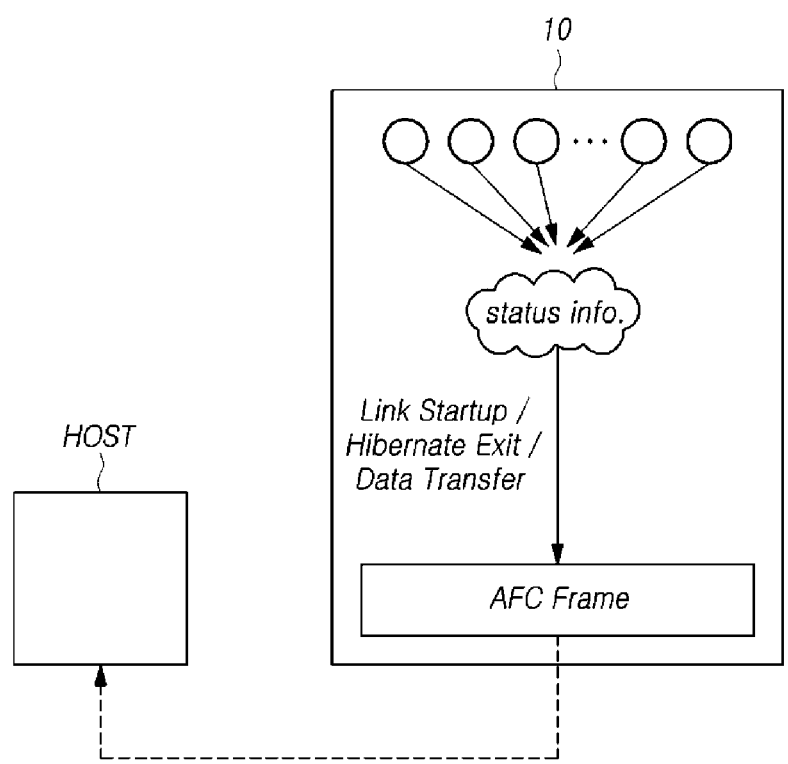
FIG. 10 is a diagram illustrating an example of the time at which the UFS device transmits the AFC frame to the host according to embodiments of the present disclosure.

FIG. 10 is a diagram illustrating an example of the time at which the UFS device 10 transmits the AFC frame to the host according to embodiments of the present disclosure.

Referring to FIG. 10, the UFS device 10 may transmit the AFC frame to the host at the time of link start-up, the hibernate state exit, or a data transfer between the host and the UFS device 10.

The link startup time may refer to a time when the UFS device 10 and the host are connected through the link in order to communicate with each other.

The hibernate state exit time may mean the time point at which the hibernate state for reducing power consumption ends.

The data transfer time between the host and the UFS device 10 may mean a time when the host or the UFS device 10 transmits data (including a command and a response to the corresponding command).

Figure 11:
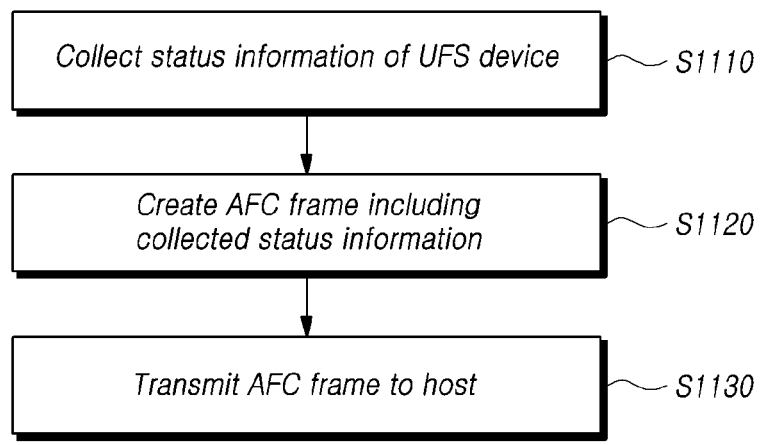
FIG. 11 is a diagram illustrating a method of operating the UFS device according to embodiments of the present disclosure.

FIG. 11 is a diagram illustrating a method of operating the UFS device 10 according to embodiments of the present disclosure.

Referring to FIG. 11, the operating method of the UFS device 10 may include collecting status information of the UFS device 10 (S1110).

The status information of the UFS device 10 may include at least one of temperature information of the UFS device, voltage change information of the UFS device 10, information of the communication layer between the host and the UFS device 10 (e.g., data link layer, physical layer) and information on the command transmission hold request for the host.

Moreover, the information of the communication layer between the host and the UFS device 10 may include at least one of error accumulation information, which is information on errors that have accumulatively occurred in the corresponding communication layer, and error recovery information, which is information on the recovery operation for the error occurred in the corresponding communication layer.

The operating method of the UFS device 10 may include creating the AFC frame including the status information collected in operation S1110 (S1120).

In S1120, the UFS device 10 may write the status information to one or more status information registers included in the UFS device 10, and then may store, in the AFC frame, the status information written in the status information register. In this case, the status information may be written to the status information register when an event indicating the change in status information occurs.

In addition, the operating method of the UFS device 10 may include transmitting the AFC frame created in operation S1120 to the host performing communication with the UFS device 10 (S1130).

As an example, the AFC frame may be transmitted to the host at the link startup time, the hibernate state exit time, or the data transfer time between the host and the UFS device 10.

Figure 12:
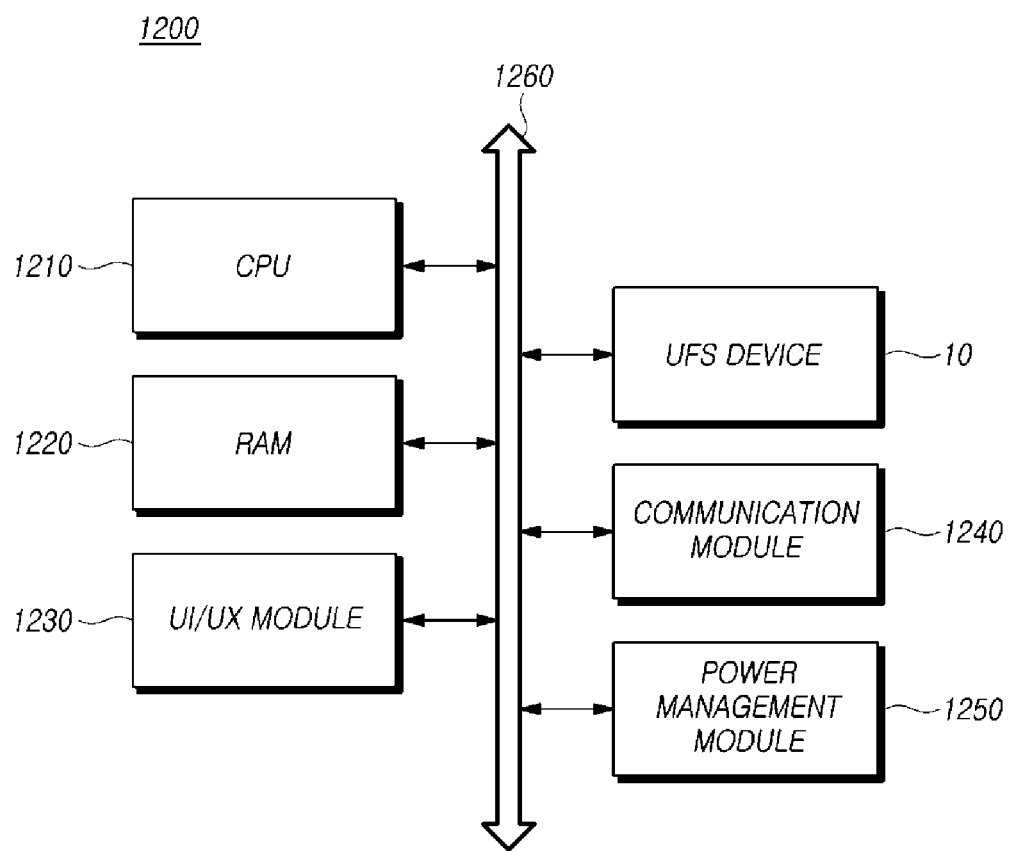
FIG. 12 is a diagram illustrating the configuration of a computing system based on some embodiments of the disclosed technology.

FIG. 12 is a diagram illustrating the configuration of a computing system 1200 based on an embodiment of the disclosed technology.

Referring to FIG. 12, the computing system 1200 based on an embodiment of the disclosed technology may include: a UFS device 10 electrically connected to a system bus 1260; a CPU 1210 configured to control the overall operation of the computing system 1200; a RAM 1220 configured to store data and information related to operations of the computing system 1200; a user interface/user experience (UI/UX) module 1230 configured to provide the user with a user environment; a communication module 1240 configured to communicate with an external device as a wired and/or wireless type; and a power management module 1250 configured to manage power used by the computing system 1200.

The computing system 1200 may be a personal computer (PC) or may include a mobile terminal such as a smartphone, a tablet or various electronic devices.

The computing system 1200 may further include a battery for supplying an operating voltage, and may further include an application chipset, a graphic-related module, a camera image processor, and a DRAM. Other elements would be apparent to a person skilled in the art.

The UFS device 10 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the UFS device 10 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the appended claims.

What is claimed is:

1. A universal flash storage (UFS) device configured to, collect status information of the UFS device,
create an Acknowledgement and Flow Control (AFC) frame, which is a frame used for the flow control between a host and the UFS device on a data link and includes a sequence number for data received by the UFS device at the time when executing the data transfer operation between the host and the UFS device, including the collected status information, and
transmit the AFC frame to the host while the host is performing communication with the UFS device so that the status information of the UFS device is checked by the host in real time.

2. The UFS device of claim 1, wherein the status information includes at least one of temperature information of the UFS device, voltage change information of the UFS device, information on a communication layer between the host and the UFS device, and command transmission hold request information for the host.

3. The UFS device of claim 2, wherein the communication layer is a data link layer or a physical layer.

4. The UFS device of claim 2, wherein the information on the communication layer includes at least one of error accumulation information which is information on errors accumulatively occurring in the communication layer, and error recovery information which is information on an operation of recovering the errors occurring in the communication layer.

5. The UFS device of claim 1, wherein the UFS device creates the AFC frame by:
writing the status information to one or more status information registers included in the UFS device, and
storing, in the created AFC frame, the status information written in the status information registers.

6. The UFS device of claim 5, wherein the UFS device writes the status information to the status information registers when an event indicating a change of the status information occurs.

7. The UFS device of claim 1, wherein the UFS device transmits the AFC frame to the host at a link start-up time, a hibernate state exit time, or a data transfer time between the host and the UFS device.

8. An operating method of a universal flash storage (UFS) device comprising:
collecting status information of the UFS device,
creating an Acknowledgement and Flow Control (AFC) frame, which is a frame used for the flow control between a host and the UFS device on a data link and includes a sequence number for data received by the UFS device at the time when executing the data transfer operation between the host and the UFS device, including the collected status information, and
transmitting the AFC frame to the host while the host is performing communication with the UFS device so that the status information of the UFS device is checked by the host in real time.

9. The operating method of claim 8, wherein the status information includes at least one of temperature information of the UFS device, voltage change information of the UFS device, information on a communication layer between the host and the UFS device, and command transmission hold request information for the host.

10. The operating method of claim 9, wherein the communication layer is a data link layer or a physical layer.

11. The operating method of claim 9, wherein the information on the communication layer includes at least one of error accumulation information which is information on errors accumulatively occurring in the communication layer, and error recovery information which is information on an operation of recovering the errors occurring in the communication layer.

12. The operating method of claim 8, wherein the creating of the AFC frame includes:
writing the status information to one or more status information registers included in the UFS device; and
storing, in the created AFC frame, the status information written in the status information registers.

13. The operating method of claim 12, wherein the status information is written to the status information registers when an event indicating a change of the status information occurs.

14. The operating method of claim 8, wherein the AFC frame is transmitted to the host at a link start-up time, a hibernate state exit time, or a data transfer time between the host and the UFS device.

15. An operating method of a system including a host device and a universal flash storage (UFS) device, the operating method comprising:
communicating, by the host device and the UFS device, with each other according to a standard of Mobile Industry Processor Interface (MIPI);
providing, by the UFS device, the host device with information of a status of the UFS device through an acknowledgement and flow control (AFC) frame, which is a frame used for the flow control between the host device and the UFS device on a data link and includes a sequence number for data received by the UFS device at the time when executing the data transfer operation between the host device and the UFS device, defined by the standard; and receiving, by the host device, the AFC frame while the host device is performing communication with the UFS device so that the status information of the UFS device is checked by the host device in real time.

16. An operating method of a universal flash storage (UFS) device, the operating method comprising:

communicating with a host device according to a standard of Mobile Industry Processor Interface (MIPI); and providing the host device with information of a status of the UFS device through an acknowledgement and flow control (AFC) frame, which is a frame used for the flow control between the host device and the UFS device on a data link and includes a sequence number for data received by the UFS device at the time when executing the data transfer operation between the host device and the UFS device, defined by the standard, wherein the AFC frame is transmitted to the host device while the host device is performing communication with the UFS device so that the status information of the UFS device is checked by the host in real time.

17. An operating method of a host device, the operating method comprising:

communicating with a universal flash storage (UFS) device according to a standard of Mobile Industry Processor Interface (MIPI); and receiving from the UFS device an acknowledgement and flow control (AFC) frame, which is a frame used for the flow control between the host device and the UFS device on a data link and includes a sequence number for data received by the UFS device at the time when executing the data transfer operation between the host device and the UFS device, defined by the standard and includes information of a status of the UFS device, to recognize the status, wherein the AFC frame is transmitted to the host device while the host device is performing communication with the UFS device so that the status information of the UFS device is checked by the host in real time.

* * * * *